(12) United States Patent  
Wallis

(10) Patent No.: US 6,467,168 B2  
(45) Date of Patent: Oct. 22, 2002

(54) METHOD OF MANUFACTURING AN ARTICLE BY DIFFUSION BONDING AND SUPERPLASTIC FORMING

(75) Inventor: Michael J Wallis, Nelson (GB)

(73) Assignee: Rolls-Royce plc, London (GB)

( * ) Notice: Subject to any disclaimer, the term of this patent is extended or adjusted under 35 U.S.C. 154(b) by 0 days.

(21) Appl. No.: 09/799,044

(22) Filed: Mar. 6, 2001

(65) Prior Publication Data

US 2001/0022023 A1 Sep. 20, 2001

(30) Foreign Application Priority Data

Mar. 18, 2000 (GB) .............................................. 0006444

(51) Int. Cl.⁷ ............................................... B23P 15/00
(52) U.S. Cl. .................................. 29/889.721; 29/889.7
(58) Field of Search ....................... 29/889.721, 421.1, 29/458, 527.4, 889.7; 228/118, 141.1, 175, 199, 190

(56) References Cited

U.S. PATENT DOCUMENTS

| 5,205,470 A | * | 4/1993 | Cadwell ....................... 228/18 |
| 5,253,796 A | * | 10/1993 | Stacher et al. ............... 228/190 |
| 5,384,959 A | * | 1/1995 | Velicki ..................... 29/889.72 |
| 5,457,884 A | | 10/1995 | Fowler |
| 5,603,449 A | | 2/1997 | Mansbridge |
| 5,946,802 A | * | 9/1999 | Calle et al. ............... 29/889.72 |
| 6,087,640 A | * | 7/2000 | Gillespie et al. ............ 219/604 |
| 6,129,261 A | * | 10/2000 | Sanders ....................... 228/157 |
| 6,162,347 A | * | 12/2000 | Fleck ......................... 205/662 |

FOREIGN PATENT DOCUMENTS

| EP | 0 568 201 | 11/1993 |
| GB | 2 306 353 A | 5/1997 |

* cited by examiner

Primary Examiner—I. Cuda-Rosenbaum  
(74) Attorney, Agent, or Firm—W. Warren Taltavull; Manelli Denison & Selter PLLC

(57) ABSTRACT

A method of manufacturing a gas turbine engine fan blade (10) comprises forming three metal workpieces (30,32,34). The metal workpieces (30,32,34) are assembled into a stack (36) so that the flat surfaces (38,42,46,48) are in mating abutment. Heat and pressure is applied across the thickness of the metal workpieces (30,32,34) to diffusion bond the metal workpieces (30,32,34) together to form an integral structure (80). The integral structure (80) is upset forged at one end (58) to produce an increase in thickness (82) for forming the blade root (26). The upset forged integral structure (80) is then hot creep formed and superplastically formed to produce the required aerofoil shape and the thickened end (82) is machined to form the blade root (26). The method enables thinner metallic workpieces with better microstructure to be used and increases the yield of metallic workpieces.

24 Claims, 3 Drawing Sheets

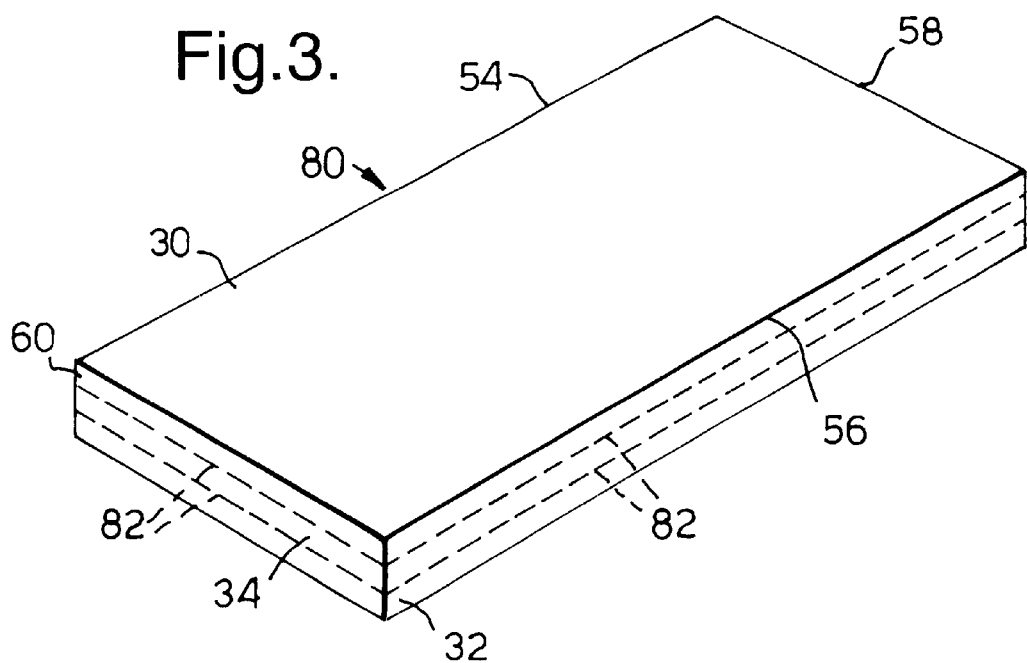
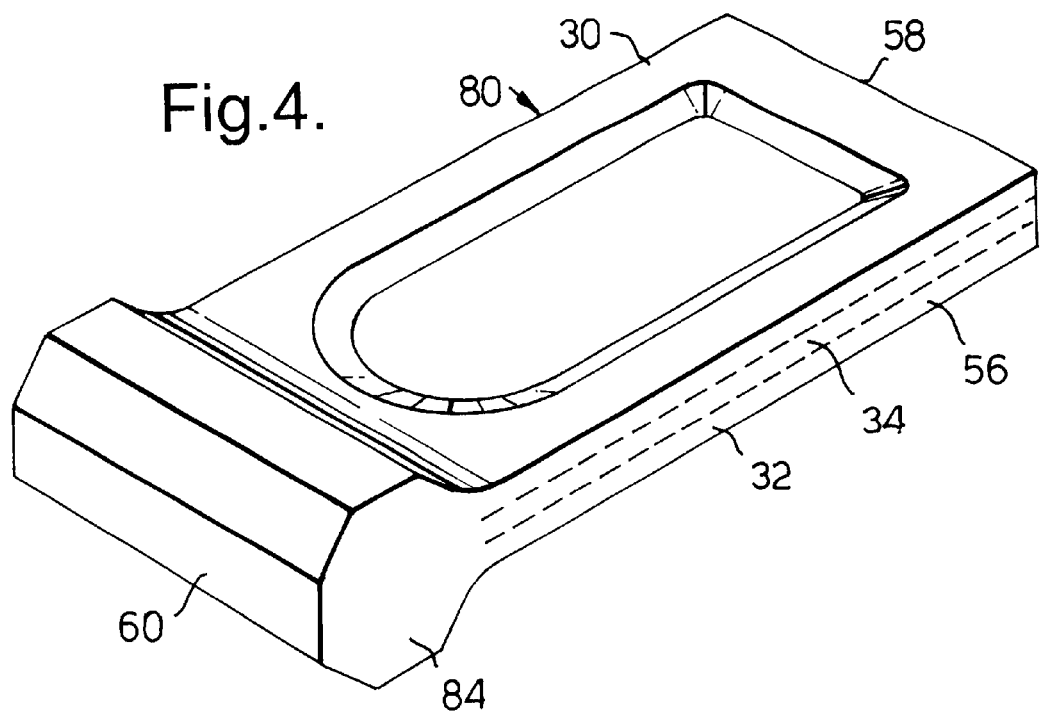

METHOD OF MANUFACTURING AN ARTICLE BY DIFFUSION BONDING AND SUPERPLASTIC FORMING

FIELD OF THE INVENTION

The present invention relates to a method of manufacturing an article by diffusion bonding and superplastic forming.

BACKGROUND OF THE INVENTION

It is known to manufacture hollow metallic articles by diffusion bonding and superplastic forming metal workpieces. These metal workpieces include elementary metal, metal alloys, intermetallic materials and metal matrix composites.

The diffusion bonding and superplastic forming process may be used to produce contoured articles for example fan blades, or fan duct outlet guide vanes, for gas turbine engines by superplastically, or hot forming, an integral structure formed by the diffusion bonding process.

A procedure for manufacturing an article by diffusion bonding and superplastic forming is disclosed in our European patent EP0568201B. In EP0568201B the integral structure formed by the diffusion bonding process is twisted before the integral structure is superplastically formed. Additionally the integral structure is hot creep formed in the superplastic forming dies.

Additionally our UK patent GB2306353B discloses manufacturing a fan blade by diffusion bonding and superplastic forming. In GB2306353B the integral structure is formed from two metallic workpieces which subsequently define the outer profile of the fan blade. The two metallic workpieces are produced by cutting an inclined slot through a parallelepiped metal block to produce two longitudinally tapering metallic workpieces. The thicker ends of the metallic workpieces are aligned to form the root of the fan blade and the remainder of the metallic workpieces are machined to the appropriate thickness to give the required mass distribution.

This manufacturing process requires that the thickness of the original parallelepiped metallic block is about half, just less than half, of the thickness of the root of the finished fan blade in order to allow machining to produce the root. A problem with this process is that it is wasteful of metal, machining time and is expensive. Additionally the microstructure of the parallelepiped metallic block is not the optimum microstructure, due to the thickness of the original metallic block.

The problem is partially overcome, as also disclosed in GB2306353B, by using thinner parallelepiped metallic blocks and adding extra small blocks at the thicker ends of the two longitudinally tapering metallic workpieces to form the root of the fan blade. However, this process is still wasteful of metal, machining time and is expensive. The microstructure of the parallelepiped block is improved due to the smaller thickness of the parallelepiped block. But there are the additional requirements of welding on the extra small blocks and evacuating the spaces between the metallic workpieces and the blocks to ensure a diffusion bond forms. The microstructure of the metallic workpieces is still not the optimum microstructure due to the thickness of the original parallelepiped metallic block.

SUMMARY OF THE INVENTION

Accordingly the present invention seeks to provide a novel method of manufacturing an article by diffusion bonding which overcomes the above mentioned problems.

Accordingly the present invention provides a method of manufacturing an article of predetermined finished profile by diffusion bonding and superplastic forming at least two metal workpieces comprising the steps of:

(a) forming at least two metal workpieces, each metal workpiece has at least one surface, (b) applying a stop off material to prevent diffusion bonding to preselected areas of at least one of the surfaces of at least one of the at least two metal workpieces, (c) assembling the at least two metal workpieces into a stack relative to each other so that the surfaces are in mating abutment, (d) applying heat and pressure across the thickness of the at least two metal workpieces to diffusion bond the at least two metal workpieces together in areas other than the preselected areas to form an integral structure, (e) forging one end of the integral structure to produce a region of increased thickness, (f) heating the integral structure and internally pressurising the integral structure to cause the preselected area of at least one of the metal workpieces to be hot formed to produce a hollow article of predetermined shape.

Preferably the method comprises after step (e) and before step (f) placing the integral structure in a hot creep forming die, heating the integral structure while it is within the die to cause the integral structure to be hot creep formed on the convex surface of the die.

Preferably step (a) comprises forming a first metallic workpiece, a second metallic workpiece and a third metallic workpiece, the third metallic workpiece having two flat surfaces, and step (c) comprises assembling the three metal workpieces into the stack relative to each other so that third metal workpiece is between the first and second metal workpieces and the flat surfaces are in mating abutment.

The hollow article may be a fan blade or a compressor blade.

Alternatively step (a) comprises forming a first metallic workpiece and a second metallic workpiece.

The hollow article may be a fan outlet guide vane, a compressor blade or a fan blade.

After diffusion bonding the stack of workpieces and before superplastically forming the integral structure, the integral structure may be heated and loads may be applied to opposite ends of the integral structure to twist one end relative to the other end to contour the integral structure to a predetermined shape.

After twisting the integral structure and before superplastic forming the integral structure, the contoured integral structure may be internally pressurised to break the adhesive bond between the stop off material and the at least one workpiece in the preselected area.

Preferably after internally pressurising the integral structure to break the adhesive bond and before internally pressurising the integral structure to superplastically form at least one metal workpiece, the interior of the integral structure is sequentially evacuated and supplied with inert gas to remove oxygen from the interior of the integral structure.

Preferably after diffusion bonding the stack of workpieces and before superplastically forming the integral structure, the integral structure is internally pressurised to break the adhesive bond between the stop off material and the at least one workpiece in the preselected area.

Preferably after the metal workpieces are arranged in a stack and before the metal workpieces are diffusion bonded together to form an integral structure, the edges of the metal workpieces are sealed.

Preferably the edges of the metal workpieces are welded together.

Preferably where the metal workpieces are made of a titanium alloy, the metal workpieces are heated to a temperature equal to, or greater than, 850° C. and the pressure applied is equal to, or greater than, $20 \times 10^5$ Nm$^{-2}$ to diffusion bond the workpieces together to form an integral structure.

Preferably the metal workpieces are heated to a temperature between 900° C. and 950° C. and the pressure applied is between $20 \times 10^5$ Nm$^{-2}$ and $30 \times 10^5$ Nm$^{-2}$.

Preferably the integral structure is heated to a temperature equal to, or greater than, 850° C. to superplastically form the integral structure.

Preferably the integral structure is heated to a temperature between 900° and 950° C.

Preferably the integral structure is hot creep formed at a temperature equal to, or greater than, 740° C.

Preferably step (e) comprises upset forging.

Preferably the region of increased thickness is machined. Preferably the region of increased thickness is subsequently machined to form a dovetail root or a firtree root. Preferably step (e) comprises heating the integral structure to a predetermined temperature before forging.

Preferably the integral structure is heated to a temperature between 900° C. and 950° C.

Preferably in step (a) each of the at least two metal workpieces has at least one flat surface.

Preferably step (a) comprises forming at least one longitudinally tapering metal workpiece and step (e) comprises upset forging the thicker end of the metal workpiece.

Preferably step (a) comprises forming two longitudinally tapering metal workpieces, step (c) comprises arranging the thicker ends of the metal workpieces at one end of the stack and step (e) comprises upset forging the thicker ends of the metal workpieces.

BRIEF DESCRIPTION OF THE DRAWINGS

The present invention will be more fully described by way of example with reference to the accompanying drawings in which:

FIG. 3 is a perspective view of the stack of three metal workpieces shown in FIG. 2 showing the integral structure after the diffusion bonding step has been performed.

FIG. 4 is a perspective view of the integral structure after the upset forging step has been performed.

DETAILED DESCRIPTION OF THE INVENTION

Figure 1:
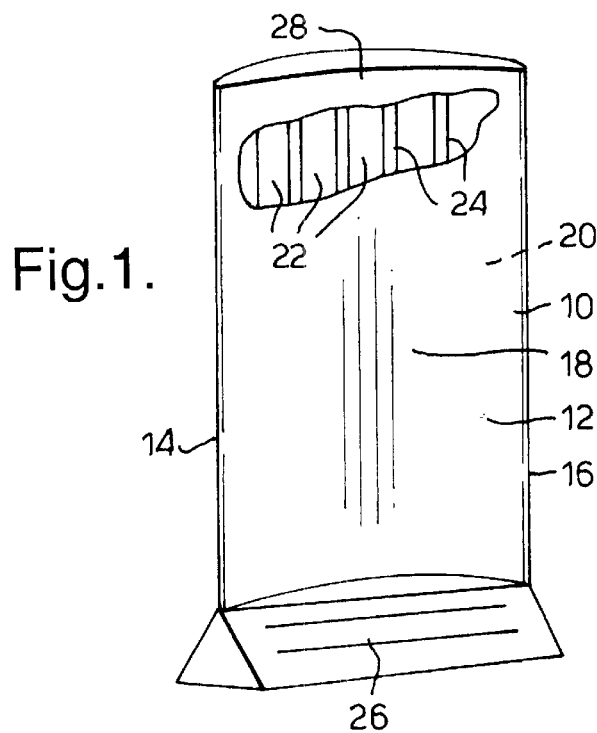
FIG. 1 shows an article manufactured by superplastic forming and diffusion bonding according to the present invention.

A turbofan gas turbine engine fan blade 10, shown in FIG. 1, comprises an aerofoil shaped body 12 which has a leading edge 14, a trailing edge 16, a concave surface 18, a convex surface 20, a root 26 and a tip 28. The fan blade 10 is hollow and comprises a plurality of spaces 22 within the aerofoil shaped body 12 separated by a warren girder structure 24.

Figure 2:
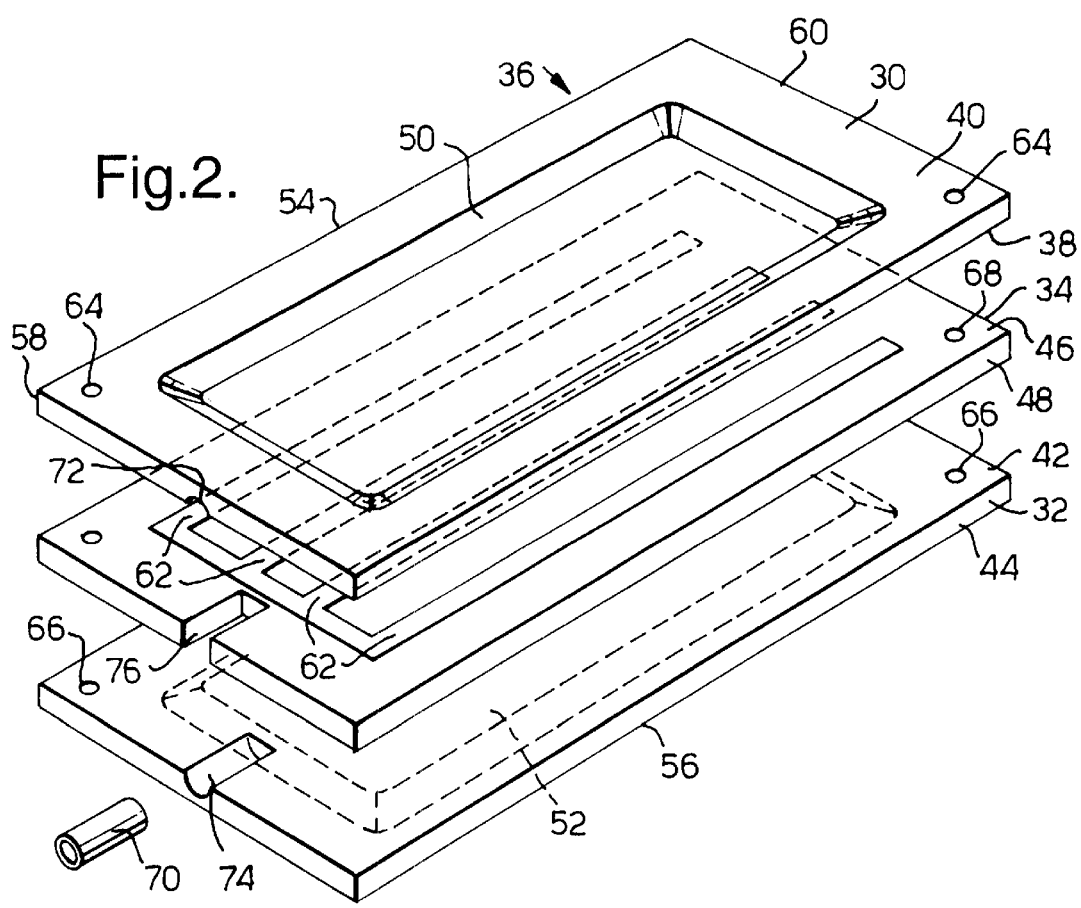
FIG. 2 illustrates an exploded view of a stack of three metal workpieces, which are superplastically formed, and diffusion bonded to form an article according to the present invention.

In FIG. 2 three sheets of titanium alloy 30, 32 and 34 are assembled into a stack 36. The sheet 30 has a single flat surface 38, the sheet 32 has a single flat surface 42 and the sheet 36 has two flat surfaces 46 and 48. The flat surfaces 38 and 46 of the sheets 30 and 34 respectively are arranged to abut each other and the flat surfaces 42 and 48 of the sheets 32 and 34 respectively are arranged to abut each other. The sheets 30 and 32 taper, increasing in thickness, longitudinally from the end 58 to the end 60.

The titanium alloy sheets 30 and 32 are produced by cutting an original parallelepiped block of titanium along an inclined plane to form the two longitudinally tapering metallic titanium sheets 30 and 32 as described more fully in our UK patent GB2306353B.

Prior to assembling the sheets 30, 32 and 34 into the stack 36, the first sheet 30 is machined in a region 50, centrally of a surface 40 of the first sheet 30, and the second sheet 32 is machined in a region 52, centrally of a surface 44 of the second sheet 32. The central machined regions 50 and 54 are contoured to produce a variation in the mass distribution of the fan blade 10 from leading edge 14 to trailing edge 16 and from root 26 to tip 28 by varying the depth of machining. For example by varying the thickness of the first and second sheets 30 and 32, across the central machined region 50 and 52 in the direction between the edges 54 and 56 and in the direction between the ends 58 and 60 of the first and second sheets 32.

The machining of the central machined regions 50 and 52 of the first and second sheets 30 and 32 respectively is by milling, electrochemical machining, chemical machining, electrodischarge machining or any other suitable machining process.

The abutting surfaces 38 and 46 of the sheets 30 and 34 and the abutting surfaces 42 and 48 of the sheets 32 and 34 respectively are then prepared for diffusion bonding by chemical cleaning. One of the abutting surfaces 38 and 46, in this example abutting surface 46, has had a stop off material 62 applied. Similarly one of the abutting surfaces 42 and 48, in this example abutting surface 48, has had a stop off material 62 applied. The stop off material 62 may comprise powdered yttria in a binder and solvent e.g. the stop off known as "Stopyt 62A" which is sold by an American company named GTE Service Corporation of 100 Endecott Street, Danvers, Mass. 10923, USA.

The stop off material 62 is applied in desired patterns, by the known silk screen printing process. The desired patterns of stop off material 62 prevent diffusion bonding between preselected areas of the sheets 30, 32 and 34. In this example the stop off material 62 is applied in straight lines on the surfaces 46 and 48 of the sheet 34 except for regions adjacent the edges 54 and 56 and ends 58 and 60 sufficient to provide a satisfactory diffusion bond.

The sheet 30 has a pair of dowel holes 64, which are axially aligned with corresponding dowel holes 66 in sheet 32 and dowel holes 68 in sheet 34 to ensure the correct positional relationship between the three sheets 30, 32 and 34. The sheets 30, 32 and 34 are maintained in this positional relationship by a pair of dowels (not shown) which are inserted into the axially aligned dowel holes 64, 66 and 68.

The sheets 30, 32 and 34 of the stack 36 are placed together to trap an end of a pipe 70. In this example a groove 72 is machined on surface 38 of the first sheet 30 and a groove 74 is machined on surface 42 of the second sheet 32 and a slot 76 is machined in the third sheet 34. The pipe 70 is positioned to project from between the three sheets 30, 32 and 34. One end of the pipe 70 interconnects with the pattern of stop off material 62 between the sheets 30, 32 and 34. On completion of the assembly in the manner described it is welded about its periphery so as to weld the edges and ends of sheets 30, 32 and 34 together. The pipe 70 is also welded around its periphery to the sheets 30, 32 and 34. A welded assembly is formed which is sealed except for the inlet provided by the pipe 70.

It is to be noted that the pipe 70 is located at one end, in this example the end 58, which subsequently forms the tip 28 of the fan blade 10, of the sealed assembly.

The pipe 70 is then connected to a vacuum pump which is used to evacuate the interior of the welded assembly and then inert gas, for example argon, is supplied to the interior of the welded assembly. This evacuating and supplying inert gas to the interior of the welded assembly may be repeated several times in order to ensure that most, or substantially all, traces of oxygen are removed from the interior of the welded assembly. The particular number of times that the interior of the welded assembly is evacuated and purged with inert gas depends upon the size of the workpieces and upon the required integrity of the finished component or article. The smaller the traces of oxygen remaining, the greater is the quality of the subsequent diffusion bond. The inert gas is supplied to pressurise the interior of the welded assembly to atmospheric pressure.

The welded assembly is evacuated and is placed in an oven. The welded assembly is then heated to a temperature between 250° C. and 350° C. to evaporate the binder from the stop off material. During the baking out of the binder, the welded assembly is continuously evacuated to remove the binder from between the sheets 30, 32 and 34. After the binder has been removed, which is determined either by monitoring the binder levels in the gas extracted from the welded assembly or by maintaining the welded assembly at the temperature between 250° C. and 350° C. for a predetermined time, the welded assembly is removed from the oven and is allowed to cool to ambient temperature whilst being continuously evacuated. The binder is baked out of the welded assembly at a suitably low temperature to reduce, or prevent, oxidation of the exterior surface of the welded assembly.

The pipe 70 is then sealed so that there is a vacuum in the welded assembly and thus a sealed assembly is formed. The sealed assembly is then transferred carefully to an autoclave. The temperature in the autoclave is increased such that the sealed assembly is heated to a temperature greater than 850° C. The argon pressure in the autoclave is raised to greater than 20 atmospheres, 294 pounds per square inch (20.26× $10^5$ $Nm^{-2}$) and held at that temperature and pressure for a predetermined time. Preferably the sealed assembly is heated to a temperature between 900° C. and 950° C. and the pressure is between 294 pounds per square inch (20.26×$10^5$ $Nm^{-2}$) and 441 pounds per square inch (30.39×$10^5$ $Nm^{-2}$). For example if the sealed assembly is heated to a temperature of 925° C. and the pressure is raised to 300 pounds per square inch the temperature and pressure are held constant for about two hours. The pressure is then reduced to ambient, diffusion bonding having been achieved and the sealed assembly, which is then an integral structure 80, is removed from the autoclave. The diffusion bonding has occurred at regions 82 indicated by dashed lines and diffusion bonding has been prevented at other regions as shown in FIG. 3.

The integral structure 80 is then upset forged at the end 60 to produce an increase in thickness 84 at the end 60 as shown in FIG. 4, which subsequently becomes the root of the fan blade 10. The upset forging comprises placing the integral structure 80 in forging dies, heating to a temperature of 900° C. to 950° C. and then forging the end 60.

The pipe 70 is removed from the integral structure 80 and a second pipe is fitted to the integral structure 80.

The integral structure 80 is then placed in a hot creep forming die and the integral structure 80 is heated while it is within the die to cause the integral structure 80 to be hot creep to produce an aerofoil shape. During the hot creep forming process the integral structure is heated to a temperature of 740° C.

The hot creep formed integral structure 80 is then placed in a superplastic forming die, which comprises a concave surface and a convex surface. Inert gas, for example argon, is introduced into the areas, within the hot creep formed integral structure 80, containing the stop off material 62 in order to break the adhesive grip, which the diffusion bonding pressure has brought about. The argon is carefully introduced to those areas which contain the stop off material 62, and the argon seeps through the stop off material 62 and eventually reaches the opposing end of the hot creep formed integral structure 80. The argon must travel the whole length of the interior of the hot creep formed integral structure 80 such as to break the adhesive grip between the stop off material 62 and the workpieces 30, 32 and 34 brought about during the diffusion bonding step.

This step may be carried out at room temperature because the metal is elastic at room temperature and the minimal extension, which occurs, does not go beyond the elastic limit. Consequently the hot creep formed integral structure 80 regains its shape when pressure is removed at the end of the step. Alternatively the step may be carried out at the superplastic forming temperature, however there is a serious risk of progressive plastic deformation lengthwise of the hot creep formed integral structure 80, rather than simultaneous deformation over the whole of the hot creep formed integral structure 80. Nevertheless the skilled artisan will be able to control the breaking of the adhesive grip by suitable control of the pressure of the argon.

The second pipe is then connected to a vacuum pump which is used to evacuate the interior of the hot creep formed integral structure 80 and then inert gas, for example argon, is supplied to the interior of the hot creep formed integral structure 80. This process of evacuating and supplying inert gas to the interior of the hot creep formed integral structure 80 may be repeated several times in order to ensure that most, or substantially all, traces of oxygen are removed from the interior of the hot creep formed integral structure 80. The particular number of times that the interior of the hot creep formed integral structure 80 is evacuated and purged with inert gas depends upon the size of the workpieces and upon the required integrity of the finished component. The inert gas is supplied to pressurise the interior of the hot creep formed integral structure 80 to atmospheric pressure.

The hot creep formed integral structure 80 and superplastic forming die is placed in an autoclave. The hot creep formed integral structure 80 is again heated to a temperature greater than 850° C., preferably between 900° C. and 950° C. In this example, the dies and hot creep formed integral structure 80 are heated to 925° C. Inert gas, for example argon, is introduced into the interior of the hot creep formed integral structure 80 between the sheets 30, 32 and 34, so as to hot form the sheets 30 and 34 onto the surfaces of the die. This superplastically forms the sheet 34 to generate a hollow internal structure depending on the pattern of the applied stop off material 62.

The magnitude of the movement of at least one of the sheets during deformation is such as to require superplastic extension to occur. The term "superplastic" is a standard term in the metal forming art and will not be described herein.

In order to achieve superplastic forming without rupturing the thinning metal the argon is introduced in a series of pulses, at a pre-calculated rate which will achieve a desired strain rate, as is taught at pp 615–623 in the book "The Science, Technology and Application of Titanium" edited by R. I. Jaffe and N. E. Promisel, published by Pergamon Press in 1970, which is hereby incorporated by reference. The method ensures that the metal is subjected to that strain rate which will achieve the maximum permissible speed of extension at any given point in the procedure. The rate of application, and/or volume of the pulses of the gas pulses may thus vary during the expansion of the sheets 30, 32 and 34.

On completion of hot forming/superplastic forming, the inert argon atmosphere within the integral structure is maintained whilst the structure is cooled. The integral structure is then machined and/or ground to remove excess metal and to produce the required leading edge and trailing edge shapes 14 and 16 of the finished fan blade 10 and to machine the increased thickness region 82 to produce a dovetail root or fir-tree root 26.

The advantage of upset forging the integral structure formed by diffusion bonding the metallic workpieces is that thinner original parallelepiped metallic blocks are used. This enables the use of metallic blocks, and hence metallic workpieces, with improved microstructure.

The use of thinner parallelepiped metallic blocks enables more metallic workpieces to be obtained from a single ingot of metal and thus more fan blades from a single ingot of metal. This also dispenses with the need to use additional metal blocks to form the root. The amount of machining required on the metallic workpieces before they are diffusion bonded together is reduced because the metallic workpieces are closer to finished shape and size.

For example a single ingot of titanium produced thirty parallelepiped blocks, of 21 mm thickness, which subsequently require cutting to produce sixty metal workpieces to form thirty fan blades. Whereas a single ingot of titanium produced forty five parallelepiped blocks, of 14 mm thickness, which subsequently require cutting to produce ninety metal workpieces to form forty five fan blades. This is a fifty percent improvement in material utilisation.

Figure 5:
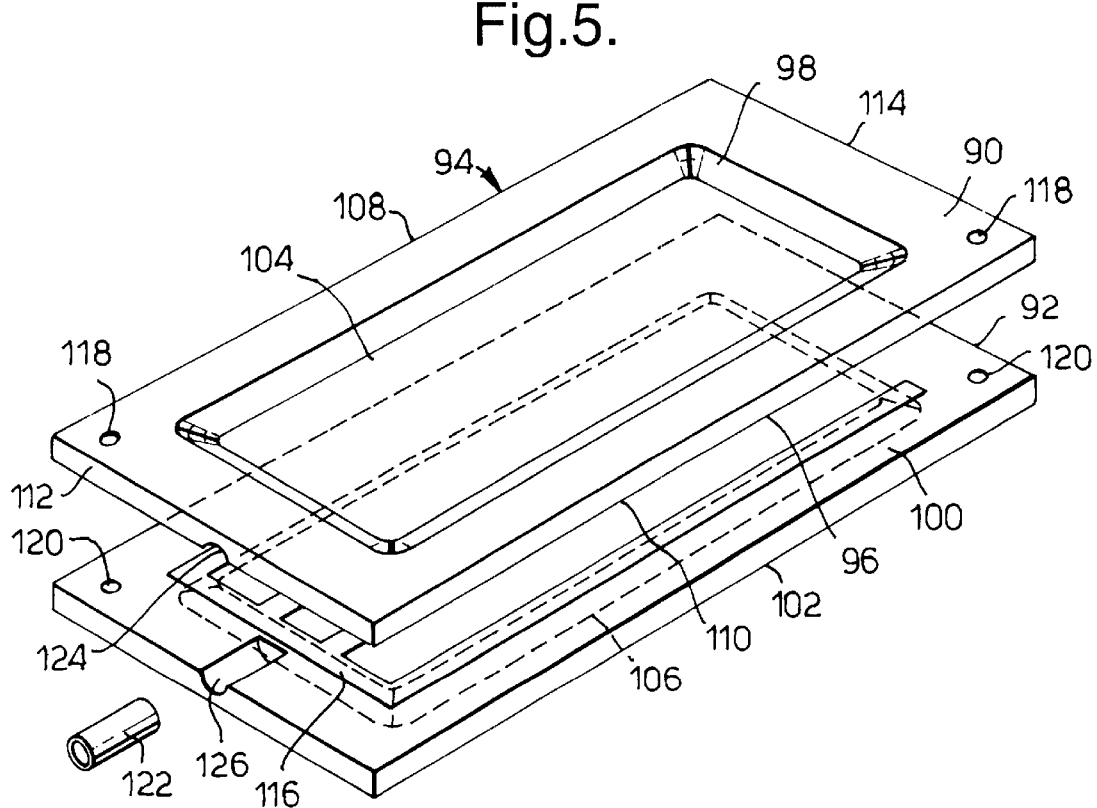
FIG. 5 illustrates an exploded view of a stack of two metal workpieces, which are superplastically formed, and diffusion bonded to form an article according to the present invention.

Another embodiment of the invention is shown in FIG. 5. In this embodiment two sheets of titanium alloy 90 and 92 are assembled into a stack 94 as shown in FIG. 4. The sheet 90 has a flat surface 96 and the sheet 94 has a flat surface 100. The flat surfaces 96 and 100 of the sheets 90 and 92 respectively are arranged to abut each other. The sheets 90 and 92 taper, increasing in thickness, longitudinally from the end 112 to the end 114.

The titanium alloy sheets 90 and 92 are produced by cutting an original parallelepiped block of titanium along an inclined plane to form two longitudinally tapering metallic titanium sheets 90 and 92 as described more fully in our UK patent GB2306353B.

Prior to assembling the sheets 90 and 92 into the stack 94, the first and second sheets 90 and 92 are machined in regions 104 and 106 centrally of the surfaces 98 and 102 of the first and second sheets 90 and 92 respectively. The central machined regions 104 and 106 are contoured to produce a variation in the mass distribution of a fan blade, a fan outlet guide vane or a compressor blade, from leading edge to trailing edge and from root to tip by varying the depth of machining. For example by varying the thickness of the first and second sheets 90 and 92 respectively, across the central machined regions 104 and 106 in the direction between the edges 108 and 110 and in the direction between the ends 112 and 114 of the first and second sheets 92 and 94.

The machining of the central machined regions 104 and 106 of the first and second sheets 90 and 92 is by milling, electrochemical machining, chemical machining, electrodischarge machining or any other suitable machining process.

The abutting surfaces 96 and 100 of the sheets 90 and 92 respectively are then prepared for diffusion bonding by chemical cleaning. One of the abutting surfaces 96 and 100, in this example abutting surface 100, has had a stop off material 116 applied. The stop off material 116 may comprise powdered yttria in a binder and solvent e.g. the stop off known as "Stopyt 62A" which is sold by an American company named GTE Service Corporation of 100 Endecott Street, Danvers, Mass. 10923, USA.

The stop off material 116 is applied in desired patterns, by the known silk screen printing process. The desired patterns of stop off material 116 prevent diffusion bonding between preselected areas of the sheets 90 and 92. In this example the stop off material 116 is applied centrally of the surface 100 of the sheet 92 except for regions adjacent the edges 108 and 110 and ends 112 and 114 sufficient to provide a satisfactory diffusion bond.

The sheet 90 has a pair of dowel holes 118, which are axially aligned with corresponding dowel holes 120 in sheet 92 to ensure the correct positional relationship between the two sheets 90 and 92. The sheets 90 and 92 are maintained in this positional relationship by a pair of dowels (not shown) which are inserted into the axially aligned dowel holes 118 and 120.

The sheets 90 and 92 of the stack 94 are placed together to trap an end of a pipe 122. In this example a groove 124 is machined on surface 96 of the first sheet 90 and a groove 126 is machined on surface 100 of the second sheet 92. The pipe 122 is positioned to project from between the two sheets 90 and 92. One end of the pipe 122 interconnects with the pattern of stop off material 116 between the sheets 90 and 92. On completion of the assembly in the manner described it is welded about its periphery so as to weld the edges and ends of sheets 90 and 92 together. The pipe 122 is also welded around its periphery to the sheets 90 and 92. A welded assembly is formed which is sealed except for the inlet provided by the pipe 122.

The pipe 122 is then connected to a vacuum pump which is used to evacuate the interior of the welded assembly and then inert gas, for example argon, is supplied to the interior of the welded assembly. This evacuating and supplying inert gas to the interior of the welded assembly may be repeated several times in order to ensure that most, or substantially all, traces of oxygen are removed from the interior of the welded assembly. The particular number of times that the interior of the welded assembly is evacuated and purged with inert gas depends upon the size of the workpieces and upon the required integrity of the finished component or article. The smaller the traces of oxygen remaining, the greater is the quality of the subsequent diffusion bond. The inert gas is supplied to pressurise the interior of the welded assembly to atmospheric pressure.

The welded assembly is evacuated and is placed in an oven. The welded assembly is then heated to a temperature between 250° C. and 350° C. to evaporate the binder from the stop off material. During the baking out of the binder, the welded assembly is continuously evacuated to remove the binder from between the sheets 90 and 92. After the binder has been removed, which is determined either by monitoring the binder levels in the gas extracted from the welded assembly or by maintaining the welded assembly at the temperature between 250° C. and 350° C. for a predetermined time, the welded assembly is removed from the oven and is allowed to cool to ambient temperature whilst being continuously evacuated. The binder is baked out of the welded assembly at a suitably low temperature to reduce, or prevent, oxidation of the exterior surface of the welded assembly.

The pipe 122 is then sealed so that there is a vacuum in the welded assembly and it now forms a sealed assembly. The sealed assembly is then transferred carefully to an autoclave. The temperature in the autoclave is increased such that the sealed assembly is heated to a temperature greater than 850° C. The argon pressure in the autoclave is raised to greater than 20 atmospheres, 294 pounds per square inch ($20.26 \times 10^5$ $Nm^{-2}$) and held at that temperature and pressure for a predetermined time. Preferably the sealed assembly is heated to a temperature between 900° C. and 950° C. and the pressure is between 294 pounds per square inch ($20.26 \times 10^5$ $Nm^{-2}$) and 441 pounds per square inch ($30.39 \times 10^5$ $Nm^{-2}$). For example if the sealed assembly is heated to a temperature of 925° C. and the pressure is raised to 300 pounds per square inch the temperature and pressure are held constant for about two hours. The pressure is then reduced to ambient, diffusion bonding having been achieved and the sealed assembly, which is then an integral structure, is removed from the autoclave.

The integral structure is then upset forged at the end 114 to produce an increase in thickness at the end 114 similar to that shown in FIG. 4, which subsequently becomes the root of the fan blade, compressor blade or fan outlet guide vane. The upset forging comprises placing the integral structure in forging dies, heating to a temperature of 900° C. to 950° C. and then forging the end 114.

The pipe 122 is removed from the integral structure and a second pipe is fitted to the integral structure.

The integral structure is then placed in a hot creep forming die and the integral structure is heated while it is within the die to cause the integral structure to be hot creep to produce an aerofoil shape. During the hot creep forming process the integral structure is heated to a temperature of 740° C.

The hot creep formed integral structure is then placed in a superplastic forming die, which comprises a concave surface and a convex surface. Inert gas, for example argon, is introduced into the areas, within the hot creep formed integral structure, containing the stop off material 116 in order to break the adhesive grip, which the diffusion bonding pressure has brought about.

This step may be carried out at room temperature because the metal is elastic at room temperature and the minimal extension, which occurs, does not go beyond the elastic limit. Consequently the hot creep formed integral structure regains its shape when pressure is removed at the end of the step. Alternatively the step may be carried out at the superplastic forming temperature, however there is a serious risk of progressive plastic deformation lengthwise of the hot creep formed integral structure, rather than simultaneous deformation over the whole of the hot creep formed integral structure.

The second pipe is then connected to a vacuum pump which is used to evacuate the interior of the hot creep formed integral structure and then inert gas, for example argon, is supplied to the interior of the hot creep formed integral structure. This process of evacuating and supplying inert gas to the interior of the hot creep formed integral structure may be repeated several times in order to ensure that most, or substantially all, traces of oxygen are removed from the interior of the hot creep formed integral structure.

The hot creep formed integral structure and superplastic forming die is placed in an autoclave. The hot creep formed integral structure is again heated to a temperature greater than 850° C., preferably between 900° C. and 950° C. In this example, the dies and hot creep formed integral structure are heated to 925° C. Inert gas, for example argon, is introduced into the interior of the hot creep formed integral structure between the sheets 90 and 92, so as to hot form the sheets 90 and 92 onto the surfaces of the die. This generates a hollow internal structure depending on the pattern of the applied stop off material 116.

On completion of hot forming/superplastic forming, the inert argon atmosphere within the integral structure is maintained whilst the structure is cooled. The integral structure is then machined and/or ground to remove excess metal and to produce the required leading edge and trailing edge shapes of the finished fan blade, compressor blade or fan outlet guide vane. The increased thickness region of the integral structure is machined to produce a dovetail root, or fir-tree root, for the fan blade or compressor blade or a suitable attachment feature for a fan outlet guide vane.

The fan blade, compressor blade or fan outlet guide vane formed from two metallic workpieces is a simple hollow structure without a warren girder structure.

The advantage of upset forging the integral structure formed by diffusion bonding the metallic workpieces is again that thinner original parallelepiped metallic blocks are used. This enables the use of metallic blocks and hence metallic workpieces with improved microstructure.

The use of thinner parallelepiped metallic blocks enables more metallic workpieces to be obtained from a single ingot of metal and thus more fan blades, compressor blades or fan outlet guide vanes, from a single ingot of metal. This also dispenses with the need to use additional metal blocks to form the root or attachment feature. The amount of machining required on the metallic workpieces before they are diffusion bonded together is reduced because the metallic workpieces are closer to finished shape and size.

It is advantageous to upset forge the integral structure rather than upset forge the metallic workpieces prior to diffusion bonding, because upset forging of the metallic workpieces would roughen the surface of the metallic workpieces making it difficult to diffusion bond the metallic workpieces together.

Although the description has referred to fan blades, compressor blades and fan outlet guide vanes the invention is equally applicable to other hollow articles, or hollow components, requiring a region of increased thickness to form an attachment feature or for other purposes.

Although the description has referred to titanium sheets, or workpieces, the invention is equally applicable to other metal sheets, or workpieces, which may be hot formed or superplastically formed.

Although the description has referred to diffusion bonding flat surfaces of the metal workpieces it may be possible to diffusion bond contoured surfaces of the metal workpieces.

I claim:

1. A method of manufacturing an article of predetermined finished profile by diffusion bonding and superplastic forming at least two metal workpieces comprising the steps of:

(a) forming at least two metal workpieces, each metal workpiece has at least one surface, (b) applying a stop off material to prevent diffusion bonding preselected areas of at least one of the surface of at least one of the at least two metal workpieces, (c) assembling the at least two metal workpieces into a stack relative to each other so that the surfaces are in mating abutment, (d) applying heat and pressure across the thickness of the at least two metal workpieces to diffusion bond the at least two metal workpieces together in areas other than the preselected areas to form an integral structure, (e) upset forging one end of the integral structure to produce a region of increased thickness, (f) heating the integral structure and internally pressurizing the integral structure to cause the preselected area of at least one of the metal workpieces to be hot formed to produce a hollow article of predetermined shape.

2. A method as claimed in claim 1 wherein the method comprises after step (e) and before step (f) placing the integral structure in a hot creep forming die, heating the integral structure while it is within the die to cause the integral structure to be hot creep formed on the convex surface of the die.

3. A method as claimed in claim 1 wherein step (a) comprises forming a first metallic workpiece, a second metallic workpiece and a third metallic workpiece, the third metallic workpiece having two flat surfaces, and step (c) comprises assembling the three metal workpieces into the stack relative to each other so that third metal workpiece is between the first and second metal workpieces and the flat surfaces are in mating abutment.

4. A method as claimed in claim 3 wherein the hollow article is selected from the group comprising a fan blade and a compressor blade.

5. A method as claimed in claim 1 wherein step (a) comprises forming a first metallic workpiece and a second metallic workpiece.

6. A method as claimed in claim 5 wherein the hollow article is selected from the group comprising a fan outlet guide vane, a compressor blade and a fan blade.

7. A method as claimed in claim 1 wherein after diffusion bonding the stack of workpieces and before superplastically forming the integral structure, the integral structure is heated and loads are applied to opposite ends of the integral structure to twist one end relative to the other end to contour the integral structure to a predetermined shape.

8. A method as claimed in claim 7 wherein after twisting the integral structure and before superplastic forming the integral structure, the contoured integral structure is internally pressurised to break the adhesive bond between the stop off material and the at least one workpiece in the preselected area.

9. A method as claimed in claims 1 wherein after diffusion bonding the stack of workpieces and before superplastically forming the integral structure, the integral structure is internally pressurised to break the adhesive bond between the stop off material and the at least one workpiece in the preselected area.

10. A method as claimed in claim 9 wherein after internally pressurising the integral structure to break the adhesive bond and before internally pressurising the integral structure to superplastically form at least one metal workpiece, the interior of the integral structure is sequentially evacuated and supplied with inert gas to remove oxygen from the interior of the integral structure.

11. A method as claimed in claim 1 wherein after the metal workpieces are arranged in a stack and before the metal workpieces are diffusion bonded together to form an integral structure, the edges of the metal workpieces are sealed.

12. A method as claimed in claim 11 wherein the edges of the metal workpieces are welded together.

13. A method as claimed in claim 1 where the metal workpieces are made of a titanium alloy, the metal workpieces are heated to a temperature equal to, or greater than, 850° C. and the pressure applied is equal to, or greater than, $20 \times 10^5$ $Nm^{-2}$ to diffusion bond the workpieces together to form an integral structure.

14. A method as claimed in claim 13 wherein the metal workpieces are heated to a temperature between 900° C. and 950° C. and the pressure applied is between $20 \times 10^5$ $Nm^{-2}$ and $30 \times 10^5$ $Nm^{-2}$.

15. A method as claimed in claim 1 wherein the integral structure is heated to a temperature equal to, or greater than, 850° C. to superplastically form the integral structure.

16. A method as claimed in claim 15 wherein the integral structure is heated to a temperature between 900° and 950° C.

17. A method as claimed in claim 2 wherein the integral structure is hot creep formed at a temperature equal to, or greater than, 740° C.

18. A method as claimed in claim 1 comprising machining the region of increased thickness.

19. A method as claimed in claim 18 wherein the region of increased thickness is machined to form a dovetail root or a fir-tree root.

20. A method as claimed in claim 1 wherein step (e) comprises heating the integral structure to a predetermined temperature before forging.

21. A method as claimed in claim 20 wherein the integral structure is heated to a temperature between 900° C. and 950° C.

22. A method as claimed in claim 1 wherein in step (a) each of the at least two metal workpieces has at least one flat surface.

23. A method as claimed in claim 1 wherein step (a) comprises forming at least one longitudinally tapering metal workpiece and step (e) comprises upset forging the thicker end of the metal workpiece.

24. A method as claimed in claim 23 wherein step (a) comprises forming two longitudinally tapering metal workpieces, step (c) comprises arranging the thicker ends of the metal workpieces at one end of the stack and step (e) comprises upset forging the thicker ends of the metal workpieces.

* * * * *